Sept. 9, 1969   C. E. JOHNSON ET AL   3,465,374
LIQUID CARGO HANDLING SYSTEM
Filed Jan. 29, 1968   2 Sheets-Sheet 1

INVENTORS
CHARLES E. JOHNSON
PAUL J. KOLARIK
BY
ATTORNEY

Sept. 9, 1969   C. E. JOHNSON ET AL   3,465,374
LIQUID CARGO HANDLING SYSTEM
Filed Jan. 29, 1968   2 Sheets-Sheet 2
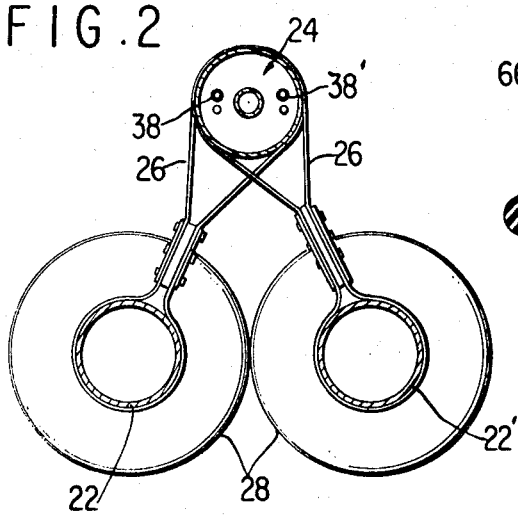
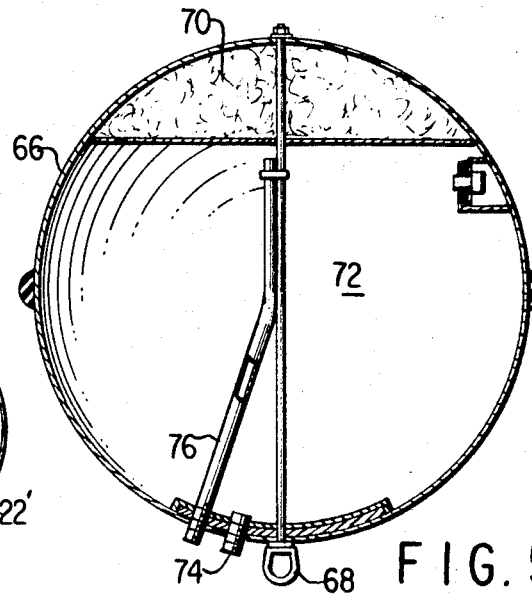
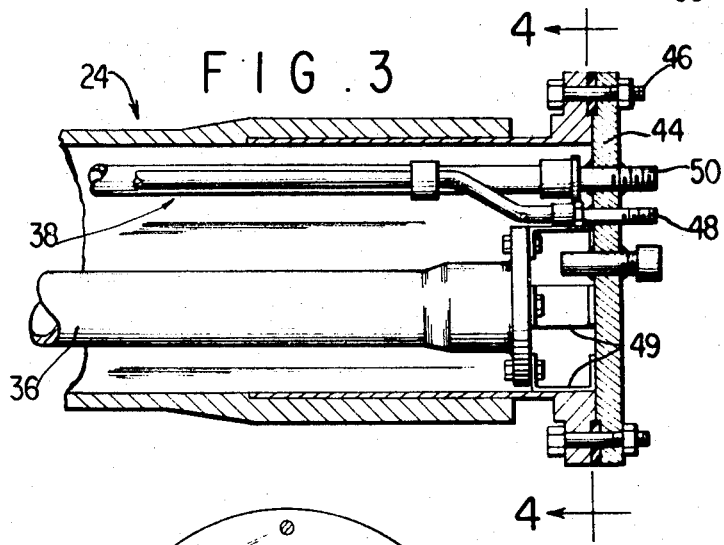
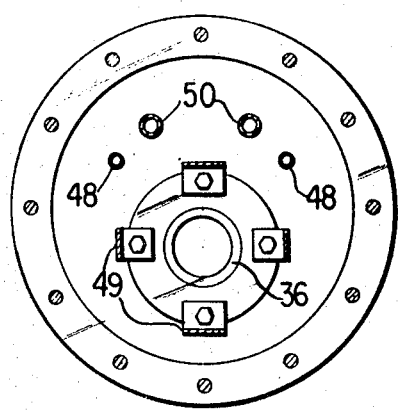
INVENTORS
CHARLES E. JOHNSON
PAUL J. KOLARIK
BY
John D. Boos
ATTORNEY

United States Patent Office 3,465,374
Patented Sept. 9, 1969

3,465,374
LIQUID CARGO HANDLING SYSTEM
Charles E. Johnson and Paul J. Kolarik, Buffalo, N.Y., assignors to Hewitt-Robins Incorporated, Stamford, Conn., a corporation of Delaware
Filed Jan. 29, 1968, Ser. No. 701,420
Int. Cl. B63b 13/00
U.S. Cl. 9—8                                                  8 Claims

ABSTRACT OF THE DISCLOSURE

In the present invention a secondary float-sink means is attached to the outboard end section of a flexible supply conduit in an off-shore fluid handling system. This secondary float-sink means combines with a ballasting system and a primary float-sink means (i.e. a satellite hose) attached to the inboard section of the conduit to enable the entire conduit to be raised and lowered without excessively inhibiting the flexibility of the outboard end section of the supply conduit.

BACKGROUND OF THE INVENTION

Modern deep-draft cargo vessels, such as the present day super tankers, frequently load or unload their liquid cargo through a supply line which extends from a supply tank on the land to some remote off-shore location. In order to keep the end of the line, which is connected to the cargo vessel, out of the shipping lanes, it has been proposed to sink the line when it is not in use and to float the line when it is desired to connect it to a ship for loading or unloading purposes. One such system envisions the use of a satellite hose which is attached to the conduit and which can be filled with either water to sink the system or with air in order to float the system. This type of system would be extremely difficult to handle if the conduit and the satellite hose were made coextensive in length and the end section of the conduit could not be easily flexed for attaching to or detaching from, the manifold of an offshore vessel. Furthermore, it has been found desirable to provide some means for supporting the outboard section of the conduit when the remainder of the conduit is raised by the satellite hose.

The above problems are overcome by the present invention through the use of a ballasting system in combination with a satellite hose type of float-sink means and a secondary float-sink means. The satellite hose is coupled to the inboard end section of the product lines at spaced locations. The secondary float-sink means are individual buoys which are coupled to the product lines in such a manner that the flexibility of the product lines is not greatly inhibited and the ballasting system is designed to fill both float-sink means with air when the system is to be raised and with water when the system is to be submerged.

Accordingly, one object of the present invention is to provide an improved liquid cargo handling system for transporting liquid between a ship located off-shore and a storage vessel or other facility.

Another object of the present invention is to provide a liquid cargo handling hose with a float-sink system which is capable of floating and sinking the outboard end section of a liquid supply hose and which float-sink system does not unduly inhibit the flexibility of the outboard end section of the hose.

A further object of the present invention is to provide a liquid handling system having a satellite hose type of primary float-sink means and a secondary float-sink means employed in combination with a ballasting system.

Still another object of the present invention is to provide an off-shore liquid handling hose system in which one end of a liquid supply hose is connected to a floating buoy and which hose can be floated or submerged without excessively stressing the inboard end section of the hose.

DESCRIPTION OF THE DRAWINGS

Other objects, advantages and novel features of the present invention will become apparent from the following detailed description of the invention when considered in conjunction with the accompanying drawings wherein:

FIG. 2 is a sectional view along line 2—2 of FIG. 1;

FIG. 3 is a longitudinal section through the outboard end of the satellite hose;

FIG. 4 is a section view along line 4—4 of FIG. 3;

FIG. 5 is a cross-sectional view through one of the auxiliary assist buoys.

Referring now to FIG. 1, the offshore liquid cargo handling system has a first conduit means comprising flexible supply lines 14 and cargo line 16 extending from the floating buoy 12 along the harbor bottom 18 to a distant storage facility which, for example, might be located on shore. The floating buoy 12 is anchored in place by chains 20. The flexible hoses 14 are coupled to the buoy 12 in fluid conducting relationship with a second conduit means made up of product or supply hoses 22, 22'. In this manner liquid may be conducted either through the product lines to the storage facilities or from the storage facilities to the product lines. Coupled to the outer end of each product hose is a marker buoy 60. The outboard end of the product lines are sealed when not in use, by removable end caps 23. The float-sink system 10 of the present invention is shown coupled to buoy 12 and to the product lines 22, 22'.

The float-sink system essentially comprises primary and second float-sink means and a ballasting system which is adapted to fill both float-sink means with either of two types of fluids. The primary float-sink means is a satellite hose member 24 which extends from an elbow fixture 45 on buoy 12 along an inboard section of the product lines. The satellite hose is preferably of the hard wall type which is well known to persons skilled in this art. The satellite hose is sealed by outboard end cap 44 and the inboard elbow 45 so that the satellite hose is formed into an airtight compartment. A conventional piping and valve arrangement, not detailed, is coupled to an air compresser 80 on the buoy so that air may either be inserted at or exhausted from, the inboard end of the satellite hose. As seen in FIG. 2, the inboard section of each product line 22, 22' is connected to the satellite hose 24 by longitudinally spaced clamps 26. The product lines 22, 22' are separated by spaced annular hose floats 28 which encompass the lines and which act as a separating means in order to prevent the supply lines from knocking or hitting together.

The satellite hose has an inboard end 24a and an outboard end 24b and is made up of individual sections 30 coupled together by intermediate flange couplings 32. Extending from the buoy through elbow 45 and into the inboard end section of the satellite hose is a ballast filler hose 36 and two double passage hoses 38 and 38'. Double passage hoses are well known in the art and one type is sold under the trademark "Twin Weld" and in the present invention the double passage hose has, preferably, the two passages of different diameters. The three hoses extend through the satellite hose to the outboard end 24b. As shown in FIG. 3, the end cap 44 is coupled to the flanged coupling 42 by bolts 46 and the end of ballast filler hose 36 is properly located within the satellite hose by being attached to bracket 49 coupled to the inside surface of end cap 44. Each passage of hoses 38, 38' are coupled to a set of nipples 48, 50 which extend through the end plate. The ends of the nipples on the other side of the plate are, in turn, coupled to similar double passage hoses 52, 52' which extend to the secondary float-sink means. Bands 58 secure the double passage hoses 52, 52' to the outer surface of the supply hoses 22, 22'.

Figure 1:
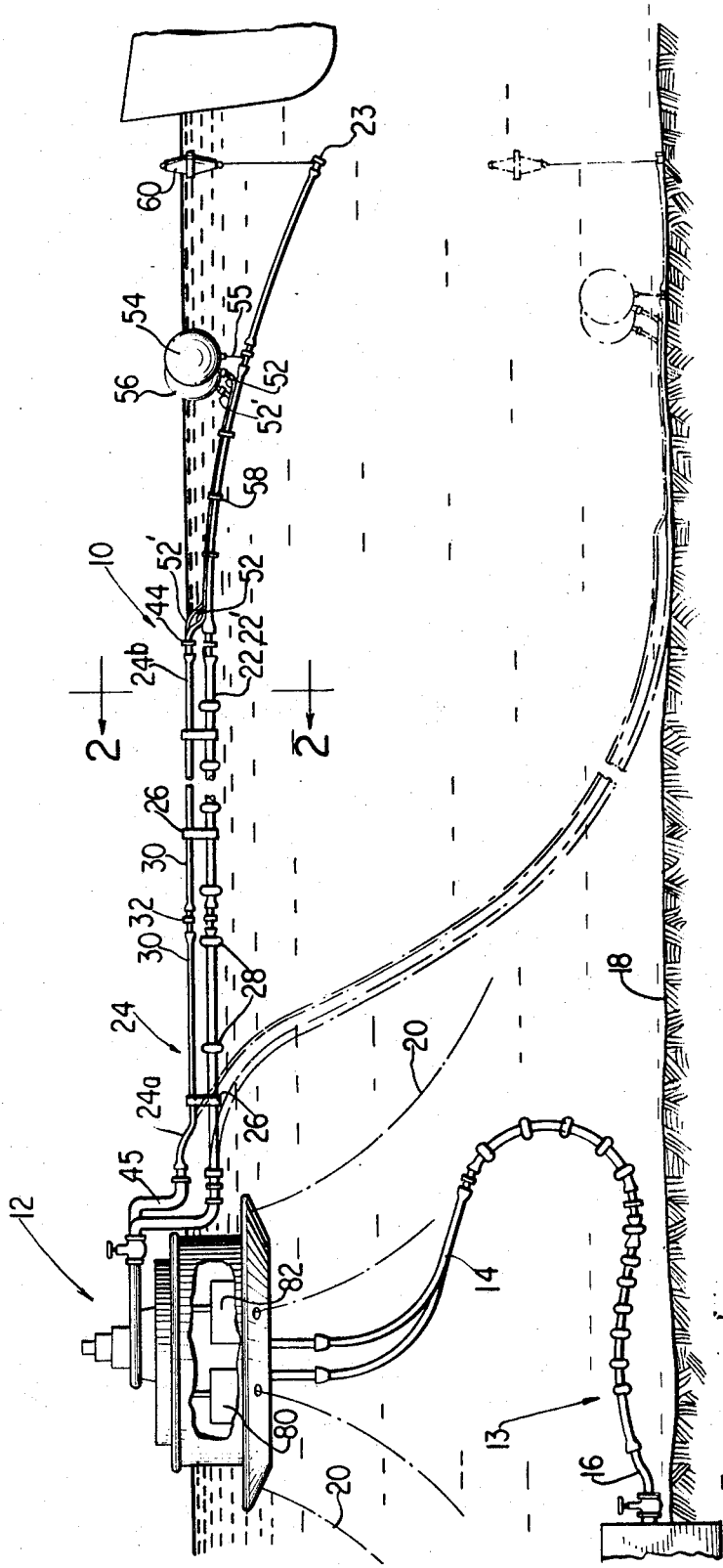
FIG. 1 is a side view of the system showing the outer end of an offshore liquid handling system having the float-sink system of the present invention.

The secondary float-sink means is made up of auxiliary assist buoys 54, 56 which are attached to the outer end section of the supply lines. Each buoy comprises a hollow shell member 66 which, for example, could be substantially spherical and which member has a swivel 68 located at the lower end of the buoy. Floatable material 70 is positioned in the upper end of the shell and this material is, for example, a plastic material having a specific gravity less than 1. This floatable material is employed in the buoys in order to give the buoys positive buoyancy so that even when the system is sunk, the buoys float upwardly away from the product hoses 22, 22'. In this manner, the buoys are prevented from settling on and damaging the product hoses. The interior of each shell defines a chamber 72. Located on the bottom of the float is a nipple 74 having a passage which connects the exterior of the buoy with the top of chamber 72 via tube 78. A double passage hose is coupled to each buoy with the smaller diameter passage being coupled to nipple 74. Chains 55 or other suitable fastening means couple the product lines 22, 22' to the swivels 68 of the buoys.

An air compressor and a water pump, schematically shown as elements 80, 82, respectively, are located on the floating buoy 12. The air compressor supplies air under pressure to the inboard end of the satellite hose, as previously described, and to the smaller diameter passage of each double passage hose. The water pump supplies water under pressure to hose 36 and to the large diameter passages of the double passage hoses. A conventional piping and valve arrangement, not shown, is employed at the buoy for distributing the air and water in the aforesaid manner. It should be noted that suitable exhaust valves are also provided in this arrangement so that either the water or the air in both types of float-sink means can be exhausted at the buoy. The operation and control of the float-sing system is accomplished manually by a person on the buoy, however, it will be recognized that this system could also be controlled with conventional remote control equipment well known in the art. Hoses 36, 38, 38', 52, 52', the air compressor, water pump and the necessary valving and controls therefor make up a ballasting system for filling both the primary and secondary float-sink means with either of two types of fluids such as, for example, water or air.

The total volume of the float-sink means is designed such that when substantially filled with water the combined system of the product lines and attached float-sink system will sink to the phantom line position substantially as shown in FIG. 1 and when substantially filled with air the combined system will float to the solid line position as shown in FIG. 1. In the first case the water in float-sink means acts as a ballast fluid which causes the total weight of the combined system to be greater than the weight of the water displaced by the system. In the second case the air serves as a second fluid, which is lighter than the ballast fluid, and which replaces the ballast fluid in the float-sink means in order to thereby cause the weight of the combined system to be less than the weight of water displaced by the system. The particular amount of air or water necessary to float or sink the system is dependent upon such factors as the total weight of the system and the volume of the float-sink means and this amount will therefore vary from system to system. It will therefore be apparent that the particular fluids need only be supplied to the float-sink means in sufficient quantity to achieve the desired result (i.e. floating or sinking the system). Furthermore, while water and air are the two preferred fluids employed in practicing this invention, it will be obvious that other types of fluid can be employed.

When the liquid handling system is not in use, the satellite hose 36 and auxiliary assist buoys 54, 56 are normally filled with water and the entire float-sink system maintains the product lines on the harbor floor, as indicated by the phantom lines in FIG. 1. If an oil tanker arrives in the general location of the buoy 12 for loading or unloading purposes, the compressed air source on the buoy could be coupled to the inboard end of the satellite hose 24 and to the smaller passages in both double passage hoses. The compressed air entering the inboard end of the satellite hose forces the water in the satellite hose back through hose 36 and is exhausted through a checkvalve at the buoy. At the same time, the compressed air moves through the small diameter passages in the double passage hoses to the auxiliary assist buoys 54, 56 and enters into the top of the chambers 72 and thereby forces the water already in the chamber out through the large diameter passages. The water forced out of the chamber 72 can be stored in a surge tank, not shown, located at the buoy end of the hoses, or, alternatively, the water in chamber 72 can be expelled through a check valve, not shown. It will thus be recognized that both the secondary assist buoys and the primary satellite hose are gradually filled with air in order to thereby float the attached product hoses 22, 22'.

Once the float-sink hose system reaches the surface of the water the tanker can then be maneuvered next to the outboard end of the product line hoses or the product line hoses can be brought to the tanker and the outboard ends of these hoses can then be connected to the manifold on the tanker. After the loading or unloading operation is completed, the product lines are disconnected from the tanker, the end caps are placed back in position on the ends of the product lines and the product lines are thrown back into the water. The float-sink system is then sunk by connecting the ballast filler hose and the large passages in the double passage hoses to the source of water under pressure. The water enters the outboard end of the satellite hose and gradually displaces the air therein by forcing the air back out through a check valve, not shown, at the buoy 12. Likewise, water is forced into the bottom of each auxiliary assist buoy and forces the air in chamber 72 out through the air line.

It will thus be recognized that the above decribed float-sink system provides a means which has the ends of the product lines unencumbered by a satellite hose. Each secondary assist buoy is connected at only one location along the length of a product line rather than being connected at a number of spaced locations, as with the satellite hose. Thus, the provision of the particular secondary float-sink means along the outboard end section of the product lines permits these sections to remain relatively flexible while at the same time having means for effecting positive floatation and submersion of the hose sections. While only one auxiliary assist buoy is shown for the outboard end section of each product hose, it will be recognized that more than one buoy may be employed and that the exact number of buoys will be dependent on such factors as the length of the outboard section and the size of the buoys.

In addition, it will be apparent that the primary and secondary float-sink systems combine to provide means which can cause the product lines to gradually rise from the inboard end during floatation and to gradually sink from the outboard end during submersion. In this manner a relatively small amount of tension is generated at the inboard section of the hoses during the floating and sinking operations.

Obviously, many modifications and variations of the present invention are possible in light of the above teaching. It is therefore to be understood that the invention may be practiced otherwise than as specifically described.

What is claimed is:
1. In an offshore liquid cargo handling system having a buoy anchored offshore in a body of water, a first conduit means coupled to said buoy for conducting fluid between said buoy and a distant location, a second conduit means coupled to said buoy in fluid conducting relationship with said first conduit means, the improvement which comprises:
   (1) primary float sink means coupled to said second conduit means at an inboard location close to said buoy,
   (2) secondary float sink means coupled to said second conduit means at an outboard location remote from said buoy,
   (3) a ballasting system coupled to said primary and said secondary float sink means; said ballasting system including means for individually supplying said primary and said secondary float sink means with either a first type of fluid for sinking said second conduit means or a second type of fluid for floating said second conduit means.

2. The improvement described in claim 1 wherein said secondary float sink means comprises individual buoys, each of said buoys being coupled to said second conduit means at only one location along the length of said second conduit means and wherein said ballasting system includes means for individually supplying said buoys with the first type of fluid or the second type of fluid.

3. The improvement described in claim 2 wherein said primary float-sink means is coupled to said second conduit means at a number of spaced locations.

4. The improvement described in claim 1 wherein said primary float-sink means is a satellite hose coupled to said second conduit means at a number of spaced locations, said satellite hose being formed into a substantially air-tight chamber, said ballasting system including a first hose means extending from said buoy through substantially the entire length of said satellite hose, said ballasting system including a second hose means extending from said buoy through said satellite hose to said secondary float-sink means.

5. The improvement described in claim 4 wherein said secondary float-sink means comprises individual buoys, each of said buoys being coupled to said second conduit means at only one location along the length of said secondary conduit means.

6. The improvement described in claim 5 wherein said second conduit means comprises two product hoses coupled to said buoy in fluid conducting relationship with said first conduit means, annular float members surrounding said flexible pipe lines at spaced locations so as to separate said two product hoses, and clamp members coupling said satellite hose to both of said product hose at spaced locations.

7. The improvement described in claim 4 wherein said second hose means comprises a dual passage hose system which enables said first type of fluid to be conducted in one of the passages and said second type of fluid to be conducted in the second passage.

8. The improvement described in claim 7 wherein said secondary float-sink means comprises at least one auxiliary buoy, said auxiliary buoy comprising a substantially hollow shell member, floatable material secured on one interior section of said shell member, connecting means formed in the wall of said shell member, said dual passage hose system being coupled to said connecting means such that the one passage of said dual passage hose system conducting said first type of fluid opens in the interior of said shell member at a location remote from said floatable material and the other passage of said dual passage hose system conducting said second type of fluid opens in the interior of said shell member at a location close to said floatable material.

References Cited
UNITED STATES PATENTS

| | | |
|---|---|---|
| 3,236,267 | 2/1966 | Bily. |
| 3,258,793 | 7/1966 | Schultz. |
| 3,311,132 | 3/1967 | McWilliams _____ 137—236 X |

TRYGVE M. BLIX, Primary Examiner